Aug. 29, 1933.  A. W. MANDELKO, JR  1,924,950
GARDEN TOOL
Filed Nov. 16, 1931   2 Sheets-Sheet 2
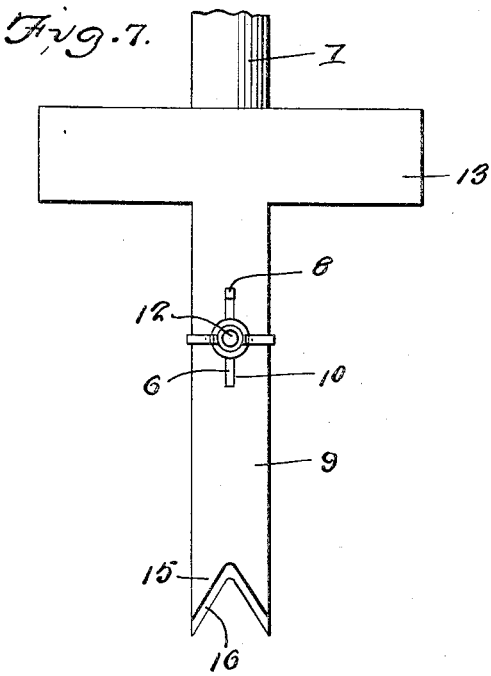
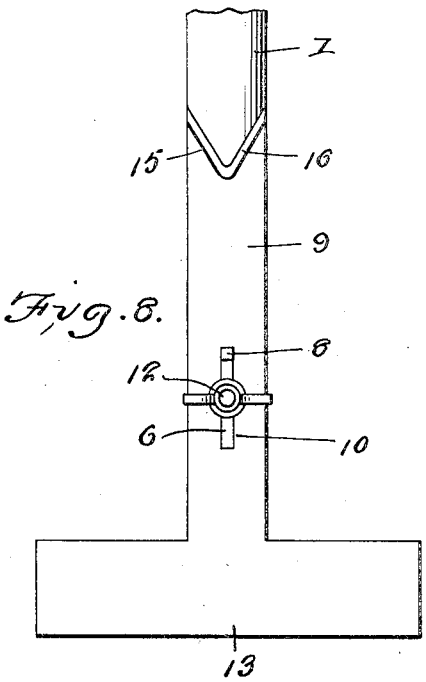
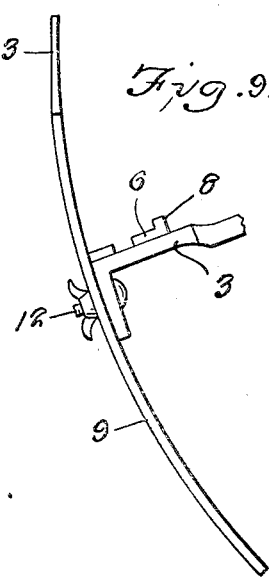
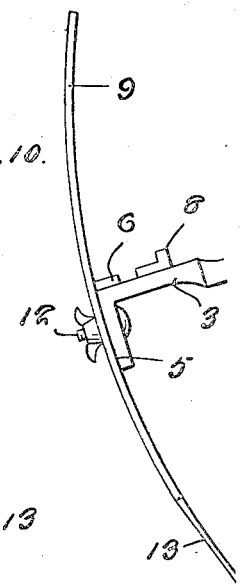
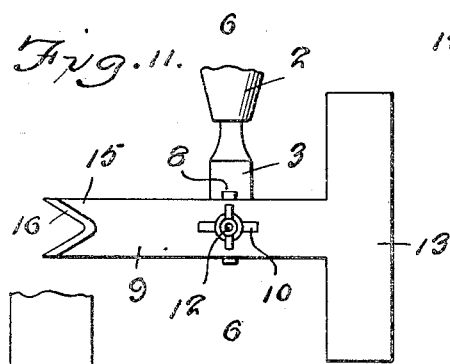
A. W. Mandelko, Jr.
INVENTOR
BY Victor J. Evans & Co.
ATTORNEY Patented Aug. 29, 1933

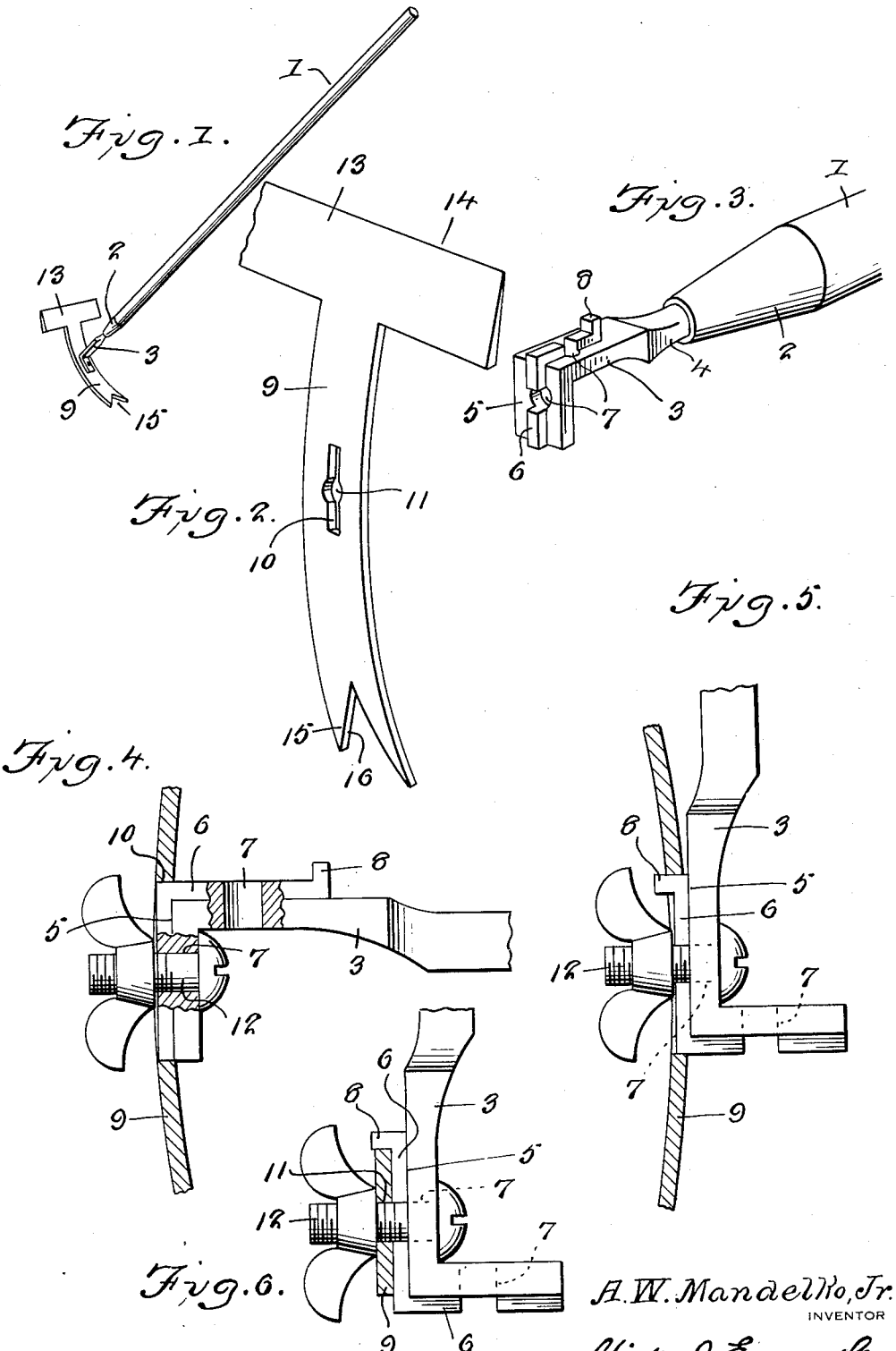

1,924,950

UNITED STATES PATENT OFFICE 1,924,950

GARDEN TOOL

August W. Mandelko, Jr., Fort Dodge, Iowa

Application November 16, 1931
Serial No. 575,369

1 Claim. (Cl. 306—6)

This invention relates to garden tool and it consists in the novel features hereinafter described and claimed.

An object of the invention is to provide a tool of the character stated which is of simple and durable structure and having its parts adapted to be assembled that the tool may be used to advantage for a number of other purposes, namely: dandelion digger, garden row worker and weeder, side walk scraper, push hoe and turf edger.

The structure comprises a handle having a shank inserted in the end thereof or applied thereto with a head provided upon the shank, said head having angularly disposed portions with lugs upon each portion and openings passing through each portion and dividing the lugs into sections. One of the lugs is provided at its end with an outstanding shoulder. The blade of the tool is provided with a curved shank having a slot therein, and a bolt opening, the slot adapted to receive the lug, and the bolt opening adapted to register with one of the openings in the head so that a bolt may be received in the registering openings and whereby the blade may be attached to the head. The shank of the blade is provided at one end with a rectangularly disposed cutting edge and at its other end the shank is provided with claws.

In the accompanying drawings:

Figure 1 is a perspective view of the tool.

Figure 2 is a perspective view of the blade detached.

Figure 3 is a perspective view of the end portion of the handle of the tool with the head applied thereto.

Figure 4 is an enlarged fragmentary sectional view of the tool.

Figure 5 is a similar view showing different arrangement of the parts from that illustrated in Figure 4.

Figure 6 is a sectional view cut on the line 6—6 of Figure 5 and showing a different arrangement.

Figure 7 is an end elevational view of the tool showing one arrangement.

Figure 8 is a plan view showing a different arrangement.

Figure 9 is a side edge elevational view of the blade and head.

Figure 10 is a similar view showing the blade inverted from the position shown in Figure 9.

Figure 11 is a plan view of still another arrangement.

Figure 12 is a side elevational view of the claw end of the shank of the blade.

As illustrated in the accompanying drawing:

A tool comprising a handle 1 having a ferrule 2 applied to the end thereof. A head member 3 is provided with a shank 4 which passes through the ferrule 2 and enters the end of the handle 1 in the usual manner. The head 3 is provided with angularly disposed portions having a flat surface 5. A rib 6 is disposed along the angularly disposed portions of the head 3 and said portions are provided with opening 7 which divides the rib 6 into sections, the rib 6 is provided at one end with an outstanding shoulder 8.

The blade consists of a longitudinally curved shank 9 having a slot 10 and an opening 11 located midway between the end of the said slot. The slot 10 is adapted to receive the aligned portions of the rib 6 and the opening 11 may be brought to register with one end of opening 7 in the head 3 whereby the said registering opening may receive a bolt 12 which secures the shank or the blade in position upon the head. It is apparent that the shank of the blade may be shifted upon the head so that it will be disposed at a right angle substantially parallel therewith or transversely across the same as illustrated in the several figures of the drawings. The shank is provided at one end with a blade portion 13 having a cutting edge 14 disposed at a right angle to the length of the shank 9. The opposite end of the shank 9 is provided with claws 15$w$ which in turn may be provided with sharpened edges 16, more clearly shown in Figure 11 of the drawings. Inasmuch as the shank 9 is curved longitudinally when the nut is tightened upon the bolt 12, the shank is partially flattened against the head and thus maintains pressure against the nut and prevents the nut from becoming unscrewed when the tool is used.

Having described the invention, what is claimed is:

A garden tool comprising a head and connected handle, the head being formed with angularly related flat surfaces of which one is disposed substantially in the plane of the handle, centrally disposed ribs extending longitudinally across said flat surfaces, that rib on the surface in the plane of the handle being provided with an outstanding shoulder portion, the head being formed in both flat surfaces with openings passing through the ribs and through the head, a ground working tool comprising a shank formed with a longitudinal slot of a length sufficient to permit either of the ribs of said head to pass therethrough, said shank having an opening at an intermediate point in the length of the slot to register with either of the openings in the head, the shank being formed at opposite extremities with ground working elements of contrasting contour, and a bolt for securing the shank to the head on either of its flat surfaces to dispose it at an angle with the handle or in alignment therewith, or transversely of the handle on top of the rib provided with the shoulder, the hole in said shank registering with the adjacent hole in the head when the edge of said shank abuts said shoulder.

AUGUST W. MANDELKO, Jr.